United States Patent
Chiang et al.

(10) Patent No.: US 8,349,413 B2
(45) Date of Patent: Jan. 8, 2013

(54) LIQUID CRYSTAL DISPLAY PANEL AND FABRICATING METHOD THEREOF

(75) Inventors: Cheng-Jung Chiang, Changhua County (TW); Chih-Ho Chiu, Taipei (TW); Chung-Ching Hsieh, Yunlin County (TW); Chia-Hsuan Pai, Taipei (TW); Bo-Hsin Huang, Tainan (TW); Te-Sheng Chen, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 742 days.

(21) Appl. No.: 12/368,281

(22) Filed: Feb. 9, 2009

(65) Prior Publication Data
US 2010/0015363 A1 Jan. 21, 2010

(30) Foreign Application Priority Data
Jul. 21, 2008 (TW) .................. 97127656 A

(51) Int. Cl.
 *C09K 19/00* (2006.01)
(52) U.S. Cl. .......... 428/1.1; 428/1.2; 349/123; 349/127; 349/130
(58) Field of Classification Search .................. 428/1.1, 428/1.2; 349/123, 124, 125, 126, 127, 129, 349/130, 131; 252/299.01
See application file for complete search history.

(56) References Cited

U.S. PATENT DOCUMENTS

| 2005/0001973 A1 | 1/2005 | Nakanishi et al. |
| 2005/0179003 A1* | 8/2005 | Heckmeier et al. ...... 252/299.01 |

FOREIGN PATENT DOCUMENTS

| CN | 101165557 | 4/2008 |
| JP | 6-160858 | 6/1994 |
| JP | 2007-256854 | 10/2007 |

OTHER PUBLICATIONS

Machine translation of JP 06-160858A.*
"1st Office Action of China counterpart application", issued on Jul. 10, 2009, p. 1-p. 6.
"Office Action of Taiwan Counterpart Application", issued on Apr. 27, 2012, p. 1-p. 5, in which the listed reference was cited.

* cited by examiner

*Primary Examiner* — Angela Ortiz
*Assistant Examiner* — Ruiyun Zhang
(74) *Attorney, Agent, or Firm* — Jianq Chyun IP Office

(57) ABSTRACT

A liquid crystal display panel including a first substrate, a second substrate, a liquid crystal layer, and a polymer stabilized alignment layer is provided. The second substrate is disposed opposite to the first substrate. The liquid crystal layer is disposed between the first substrate and the second substrate. The polymer stabilized alignment layer is disposed between the first substrate and the liquid crystal layer, and an average surface roughness of the polymer stabilized alignment layer is greater than or equal to 10 nm.

10 Claims, 4 Drawing Sheets

LIQUID CRYSTAL DISPLAY PANEL AND FABRICATING METHOD THEREOF

CROSS-REFERENCE TO RELATED APPLICATION

This application claims the priority benefit of Taiwan application serial no. 97127656, filed on Jul. 21, 2008. The entirety of the above-mentioned patent application is hereby incorporated by reference herein and made a part of specification.

BACKGROUND OF THE INVENTION

1. Field of the Invention

The present invention relates to a display panel and a fabricating method thereof, and more particularly to a liquid crystal display (LCD) panel and a fabricating method thereof.

2. Description of Related Art

Conventionally, the multi-domain vertically aligned liquid crystal display (MVA-LCD) panel utilizes an alignment structure to make liquid crystal molecules in different regions tilt at different angles to achieve the effect of wide viewing angle. The alignment structure includes alignment protrusions and alignment slits disposed on electrodes. However, light leakage usually occurs due to the disclination in tilt directions of the liquid crystal molecules surrounding the alignment protrusions and the alignment slits, which also leads to reduction of the contrast ratio of the LCD panel. To reduce light leakage, light-shielding layers disposed corresponding to the alignment protrusions and the alignment slits would cause the aperture ratio of the LCD panel to decrease.

Therefore, the prior art has proposed a polymer stabilized alignment (PSA) process to improve the poor display contrast in the MVA-LCD panel. In the polymer stabilized alignment process, first, reactive monomers are mixed in the liquid crystal layer and a specific voltage is applied to the liquid crystal layer. Under such specific voltage, the liquid crystal layer are irradiated with light or heated to polymerize the reactive monomers so that polymer stabilized alignment layers are formed at the junctions of the liquid crystal layer and substrates. The polymer stabilized alignment layers with specific alignment effects assist liquid crystal molecules of the liquid crystal layer to tilt and align in different directions to achieve the effect of wide viewing angle. In addition, the polymer stabilized alignment layers can function as substitutes for the alignment protrusions and the alignment slits, so the light leakage of the LCD panel does not occur and the display contrast in the LCD panel is enhanced. Moreover, the polymer stabilized alignment layer stabilizes the liquid crystal molecules at the junctions of the liquid crystal layer so that the liquid crystal layer has a satisfactory response time.

SUMMARY OF THE INVENTION

The present invention provides a liquid crystal display (LCD) panel having a polymer stabilized alignment layer with an average surface roughness greater than or equal to 10 nm.

The present invention further provides a fabricating method of an LCD panel to form a polymer stabilized alignment layer having an average surface roughness greater than or equal to 10 nm between a liquid crystal layer and a substrate.

The present invention provides an LCD panel including a first substrate, a second substrate, a liquid crystal layer and a polymer stabilized alignment layer. The second substrate is disposed opposite to the first substrate. The liquid crystal layer is disposed between the first substrate and the second substrate. The polymer stabilized alignment layer is disposed between the first substrate and the liquid crystal layer, and the average surface roughness Rms of the polymer stabilized alignment layer is greater than or equal to 10 nm.

According to an embodiment of the present invention, 10 nm$\leq$Rms$\leq$40 nm.

According to an embodiment of the present invention, 10 nm$\leq$Rms$\leq$30 nm.

According to an embodiment of the present invention, a material of the polymer stabilized alignment layer is an optically polymerized material or a thermally polymerized material.

According to an embodiment of the present invention, the polymer stabilized alignment layer is formed by polymerizing a monomer material. The monomer material is expressed in a chemical formula [1]:

$$B\text{-}A\text{-}R \quad [1]$$

wherein A is selected from chemical formulae [2], [3], [4] or any combination of the foregoing,

[2]

[3]

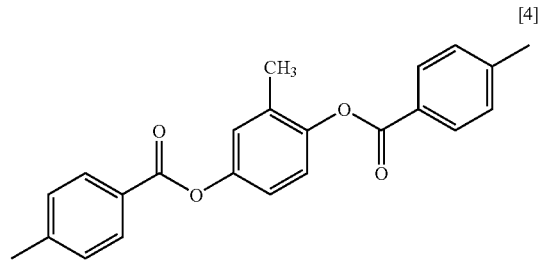

[4]

and at least one of B and R is selected from alkyl group, alkoxyl group, ester group, chemical formulae [5], [6], [7] or any combination of the foregoing:

[5]

[6]

[7]

-continued

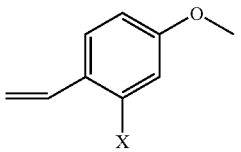

[8]

Wherein T is selected from oxygen, nitrogen or any combination of the foregoing; X is selected from hydrogen, alkyl group, halogen, cyano group or any combination of the foregoing; n is a positive integer.

According to an embodiment of the present invention, the liquid crystal layer has a plurality of vertically-aligned liquid crystal molecules, and the liquid crystal molecules are aligned at a pre-tilt angle.

According to an embodiment of the present invention, the first substrate and the second substrate are interchangeably a switch device array substrate and an opposite substrate.

According to an embodiment of the present invention, the LCD panel further includes a first alignment layer disposed between the polymer stabilized alignment layer and the first substrate.

According to an embodiment of the present invention, the LCD panel further includes a second polymer stabilized alignment layer disposed between the second substrate and the liquid crystal layer.

According to an embodiment of the present invention, the LCD panel further includes a second alignment layer disposed between the second polymer stabilized alignment layer and the second substrate.

The present invention further provides a fabricating method of an LCD panel. The fabricating method includes the following steps. First, a first substrate and a second substrate are provided. Next, a liquid crystal mixed material is sealed between the first substrate and the second substrate. The liquid crystal mixed material includes a liquid crystal composition, a monomer material and a polymerization initiator. Afterwards, a plurality of liquid crystal molecules in the liquid crystal composition is aligned at the pre-tilt angle. Thereafter, the monomer material is polymerized to form the polymer stabilized alignment layers between the liquid crystal mixed material and the first substrate and between the liquid crystal mixed material and the second substrate, respectively. An average surface roughness Rms of the polymer stabilized alignment layer is controlled as greater than or equal to 10 nm.

According to an embodiment of the present embodiment, 10 nm$\leq$Rms$\leq$40 nm.

According to an embodiment of the present embodiment, 10 nm$\leq$Rms$\leq$30 nm.

According to an embodiment of the present invention, the step of sealing the liquid crystal mixed material includes performing a one drop fill (ODF) process.

According to an embodiment of the present invention, the step of aligning the liquid crystal molecules in the liquid crystal composition at the pre-tilt angle includes applying an electrical field on the liquid crystal molecules.

According to an embodiment of the present invention, the step of polymerizing the monomer material includes performing an irradiating process or a heating process on the monomer material and the polymerization initiator.

According to an embodiment of the present invention, the irradiation process employs an ultraviolet light source.

According to an embodiment of the present invention, the irradiation process includes performing a first irradiation step and a second irradiation step on the monomer material and the polymerization initiator.

According to an embodiment of the present invention, an irradiation intensity of the first irradiation step is between about 0.2 mW/cm$^2$ and about 200 mW/cm$^2$, and an irradiation time is between about 10 seconds and about 10 hours, preferably between about 120 seconds and about 1800 seconds.

According to an embodiment of the present invention, the irradiation intensity of the second irradiation step is between about 0.2 mW/cm$^2$ and about 200 mW/cm$^2$, and the irradiation time is between about 10 seconds and about 10 hours, preferably between about 1 hour and about 6 hours.

According to an embodiment of the present invention, the first alignment layer is formed on the first substrate before the liquid crystal mixed material is sealed.

According to an embodiment of the present invention, the second alignment layer is formed on the second substrate before the liquid crystal mixed material is sealed.

In the LCD panel of the present invention, the average surface roughness Rms of the polymer stabilized alignment layer disposed between the substrate and the liquid crystal layer is controlled as 10 nm$\leq$Rms$\leq$40 nm to enhance an aligning ability of the polymer stabilized alignment layer on the liquid crystal molecules, improve a response time of the LCD panel and reduce image sticking. Therefore, the LCD panel achieves satisfactory display characteristics, such as fast response time, low light leakage, high contrast and low image sticking.

In order to make the above and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
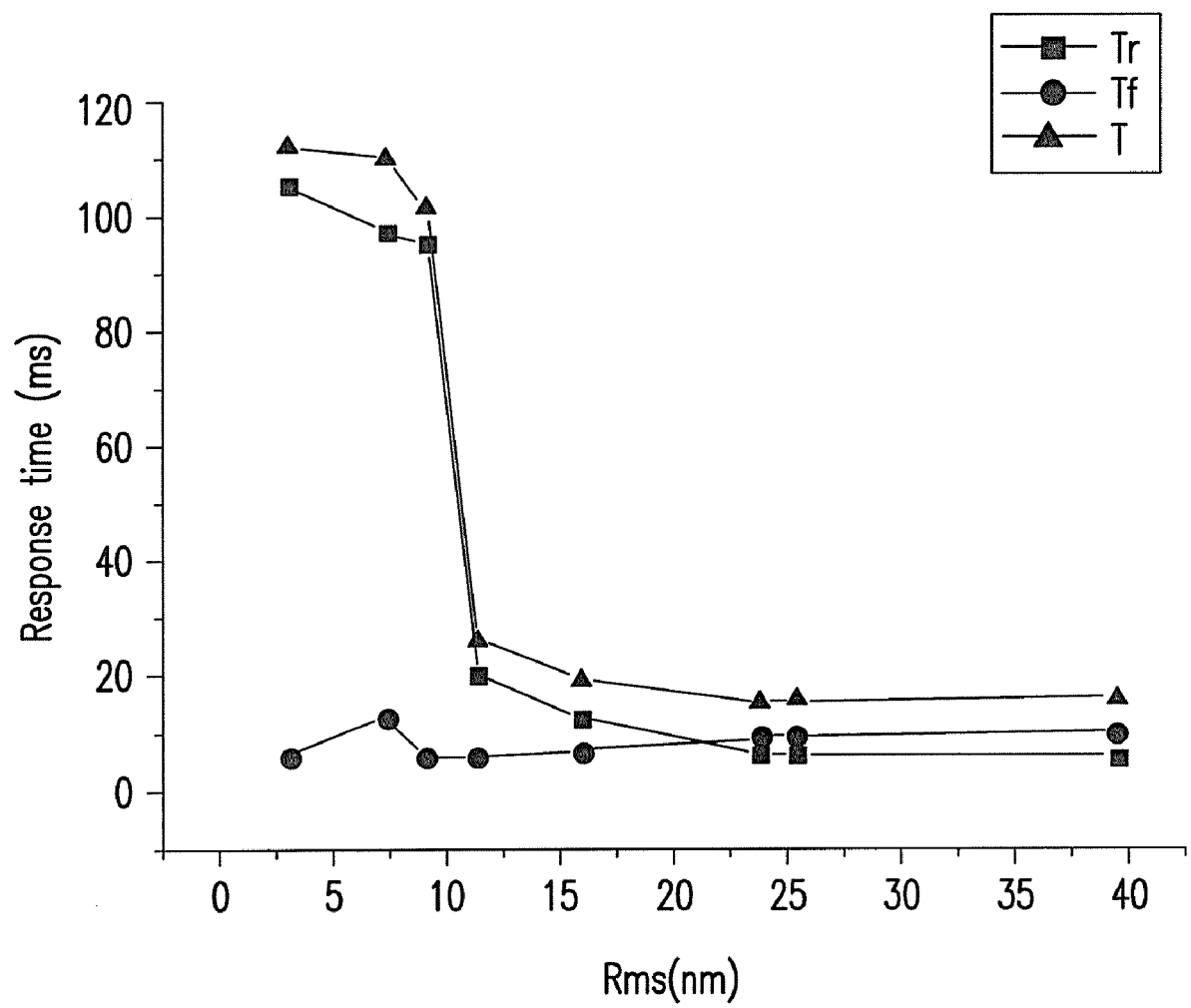
FIG. 1 shows the relationship between the average surface roughness Rms of polymer stabilized alignment layer and its related response times (Tr, Tf and T) in Table 1.

Table 1 is the result of testing LCD panels having polymer stabilized alignment layers with different average surface roughness Rms. FIG. 1 shows the relationship between an average surface roughness Rms of the polymer stabilized alignment layer and its response times (Tr, Tf and T) in Table 1. Table 1 shows a tendency between the average surface roughness Rms of the polymer stabilized alignment layer in the LCD panel and the related response time. Tr represents the response time required for a transmittance ratio of the LCD panel increasing from 10% to 90%; Tf represents the response time required for the transmittance ratio of the LCD panel decreasing from 90% to 10%, and T=Tr+Tf. In other words, the smaller T is, the faster response time of an LCD panel surface would be.

TABLE 1

| Experimental | Response Time (ms) | | | |
|---|---|---|---|---|
| Example | Tr | Tf | T | Rms (nm) |
| 1 | 105.88 | 6.08 | 111.96 | 2.871 |
| 2 | 97.51 | 12.94 | 110.45 | 7.23 |
| 3 | 95.453 | 6.123 | 101.57 | 9.015 |
| 4 | 20.12 | 5.78 | 25.9 | 11.23 |
| 5 | 12.38 | 6.84 | 19.22 | 15.86 |
| 6 | 6.27 | 9.02 | 15.29 | 23.691 |
| 7 | 6.27 | 9.41 | 15.68 | 25.321 |
| 8 | 5.71 | 10.14 | 15.84 | 39.48 |

Referring to both Table 1 and FIG. 1, when the average surface roughness Rms of the polymer stabilized alignment layer is greater than or equal to 10 nm, the response time of the LCD panel becomes faster. In other words, within this range, the polymer stabilized alignment layer has a better ability to align and stabilize liquid crystal molecules, and thereby speed up the response time of the LCD panel to prevent image sticking in the LCD. On the contrary, when the average surface roughness Rms of the polymer stabilized alignment layer is smaller than 10 nm, the polymer stabilized alignment layer has a poorer aligning ability, and the response time of the LCD panel becomes rather long. Additionally, when the average surface roughness Rms of the polymer stabilized alignment layer is too rough, such larger than 40 nm, the contrast of the LCD panel would drop and an optical uniformity would deteriorate, which reduces the reliability of the LCD panel. Therefore, in the present invention, the average surface roughness Rms of the polymer stabilized alignment layer is controlled as 10 nm≦Rms≦40 nm so that the LCD panel achieves satisfactory display characteristics, such as fast response time, low light leakage, high contrast and low image sticking. In particular, when the average surface roughness Rms of the polymer stabilized alignment layer is controlled as 10 nm≦Rms≦30 nm, the LCD panel has an even better contrast and a faster response time and thereby effectively prevents image sticking.

First Embodiment

Figure 2:
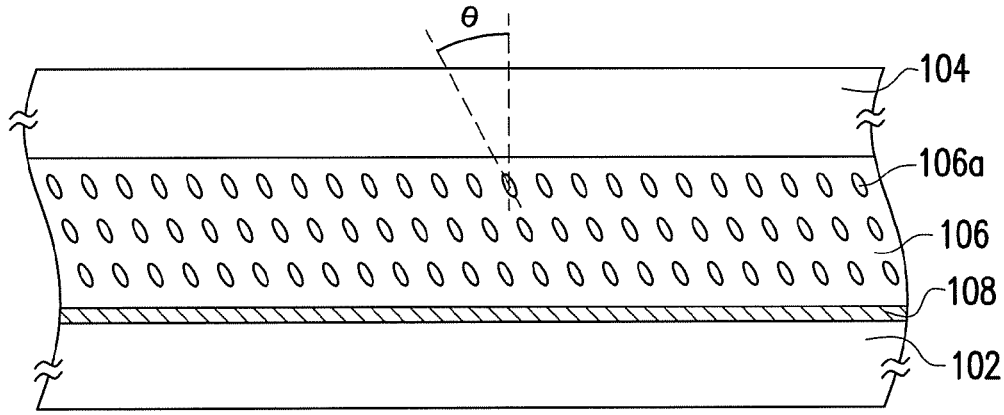
FIG. 2 is a schematic cross-sectional view of an LCD panel according to the first embodiment of the present invention.

FIG. 2 is a schematic cross-sectional view of an LCD panel according to the first embodiment of the present invention. Referring to FIG. 2, an LCD panel 100 includes a first substrate 102, a second substrate 104, a liquid crystal layer 106 and a polymer stabilized alignment layer 108. The first substrate 102 is, for example, an active or passive switch device array substrate. The second substrate 104 is an opposite substrate disposed opposite to the first substrate 102, such as a color filter substrate. The liquid crystal layer 106 is disposed between the first substrate 102 and the second substrate 104. The liquid crystal layer 106 has a plurality of vertically-aligned liquid crystal molecules 106a. Due to the function of a polymer stabilized alignment layer 108, the liquid crystal molecules 106a are aligned at a pre-tilt angle θ.

According to the present embodiment of the present invention, the polymer stabilized alignment layer 108 is disposed between the first substrate 102 and the liquid crystal layer 106. An average surface roughness Rms of the polymer stabilized alignment layer 108 is 10 nm≦Rms≦40 nm. A material of the polymer stabilized alignment layer 108 is an optically polymerized material or a thermally polymerized material. The polymer stabilized alignment layer is formed by polymerizing a monomer material, for example. The monomer material is expressed in a chemical formula [1]:

   [1]

Wherein A is selected from chemical formulae [2], [3], [4] or any combination of the foregoing:

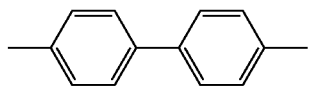   [2]

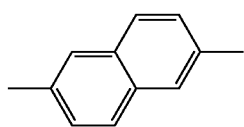   [3]

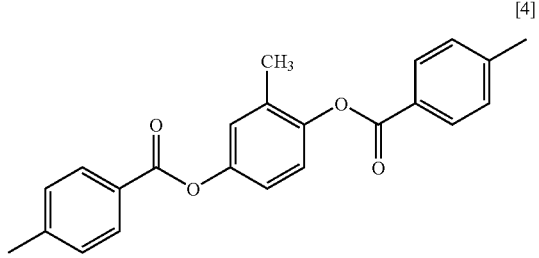   [4]

Wherein at least one of B and R is selected from alkyl group, alkoxyl group, ester group, formulae [5], [6], [7] or any combination of the foregoing:

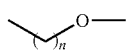   [5]

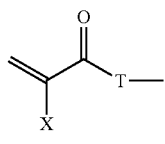   [6]

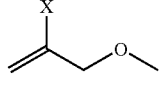   [7]

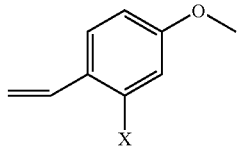   [8]

Wherein T is selected from oxygen, nitrogen or any combination of the foregoing; X is selected from hydrogen, alkyl group, halogen, cyano group or any combination of the foregoing; n is a positive integer.

The polymer stabilized alignment layer 108 provides alignment effect to the liquid crystal molecules 106a. Therefore, the liquid crystal molecules 106a are aligned at the pre-tilt angle θ. According to the present embodiment, the LCD panel 100 is, for example, an MVA-LCD panel. Hence, compared with the prior art in which only alignment protrusions and alignment slits are disposed in the LCD panel, the polymer stabilized alignment layer 108 avoids light leakage caused by disclination in tilt directions of the liquid crystal molecules surrounding the alignment protrusions and the alignment slits and thereby has a better display contrast.

According to the present embodiment, the average surface roughness Rms of the polymer stabilized alignment layer 108 is controlled as 10 nm≦Rms≦40 nm. Therefore, the LCD panel 100 achieves satisfactory display characteristics, such as fast response time, low light leakage, high contrast and low image sticking. Certainly, in order to improve the contrast and the response time of the LCD panel and effectively avoid image sticking, in another embodiment the average surface roughness Rms of the polymer stabilized alignment layer may be controlled as 10 nm≦Rms≦30 nm. Furthermore, the foregoing embodiment is exemplified by the polymer stabilized alignment layer 108 disposed between the first substrate 102 and the liquid crystal layer 106. However, the present invention is not limited thereto. In other embodiments, the polymer stabilized alignment layer may be disposed between the second substrate and the liquid crystal layer. In order to further control the alignment of the liquid crystal molecules, the polymer stabilized alignment layer may also be simultaneously disposed between the first substrate and the liquid crystal layer and between the second substrate and the liquid crystal layer such that the LCD panel achieves some satisfactory display characteristics such as fast response time, low light leakage, high contrast and low image sticking.

Second Embodiment

Figure 3:
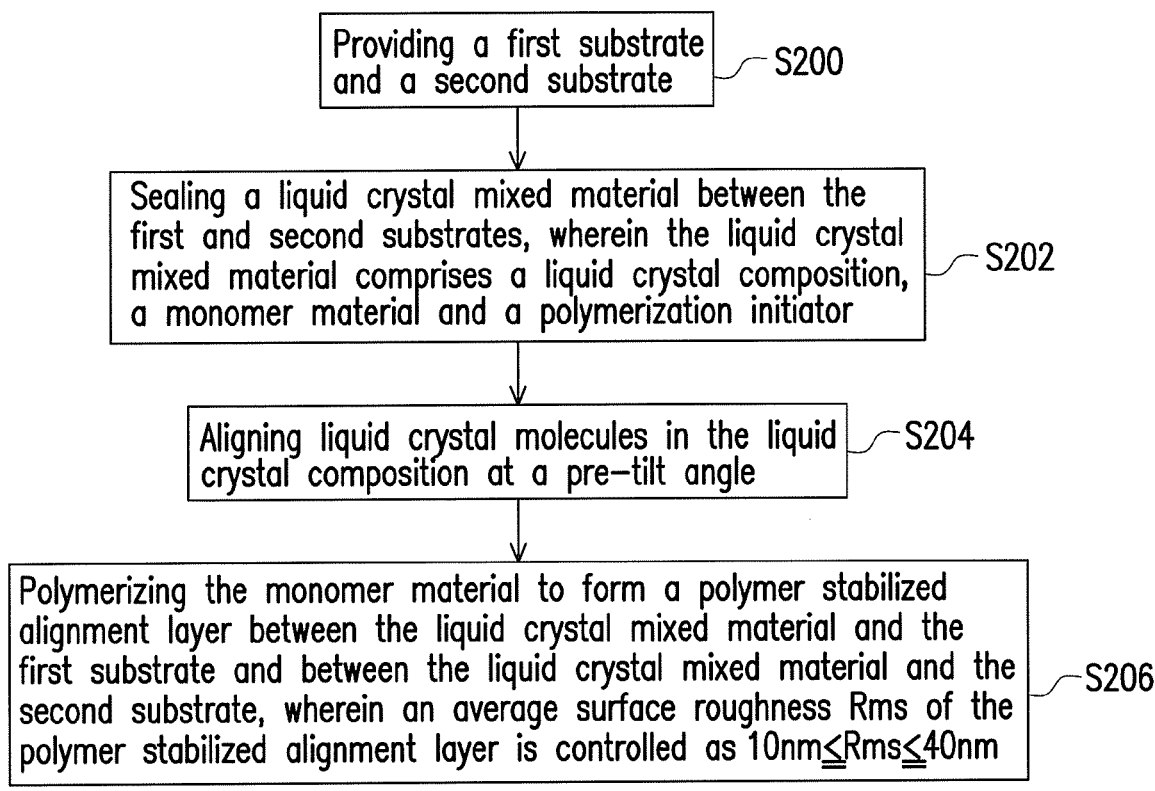
FIG. 3 is a flowchart of fabricating an LCD panel according to the second embodiment of the present invention.

FIG. 3 is a flowchart of fabricating an LCD panel according to the second embodiment of the present invention. FIGS. 4A through 4D show schematic cross-sectional views of fabricating an LCD panel according to the second embodiment of the present invention.

Figure 4A:
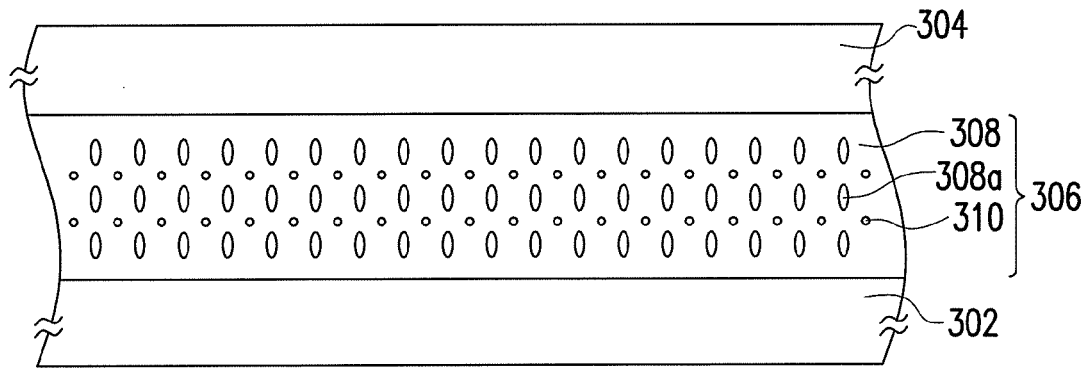
FIGS. 4A through 4D show schematic cross-sectional drawings of fabricating an LCD panel according to the second embodiment of the present invention.

Referring to both FIGS. 3 and 4A, first, a step S200 is performed to provide a first substrate 302 and a second substrate 304. The first substrate 302 is an active device array substrate, and the second substrate 304 is a color filter substrate, for example. The first substrate 302 includes a substrate (not shown) and an active layer (not shown). The second substrate 304 includes a substrate (not shown) and a color filter (not shown). In other embodiments, the first substrate may also be a color filter on array (COA) substrate which integrates the color filter on the active layer or an array on color filter (AOC) substrate which integrates the active layer on the color filter. Correspondingly, the second substrate may be a glass substrate, a plastic substrate or other suitable substrates. In other words, the second substrate does not include a color filter.

Still referring to FIGS. 3 and 4A, a step S202 is performed to seal a liquid crystal mixed material 306 between the first substrate 302 and the second substrate 304. The liquid crystal mixed material 306 includes a liquid crystal composition 308, a monomer material 310 and a polymerization initiator (not shown). The liquid crystal composition 308 includes a plurality of liquid crystal molecules 308a. Details about the monomer material 310 can be referred to the monomer material in the first embodiment and are not reiterated herein. The polymerization initiator is selected from, for example, IRGACURE 184, IRGACURE 2959, IRGACURE 1000, IRGACURE 1173, IRGACURE 500, IRGACURE 651, IRGACURE 369, IRGACURE 907, IRGACURE 1300, IRGACURE 784, IRGACURE 819 and IRGACURE 819 DW, IRGACURE 250, IRGACURE 2005 and IRGACURE 2010, and IRGACURE 2020, DAROCUR 1173, DAROCUR BP, DAROCUR MBF, DAROCUR 4265 and DAROCUR TPO or any combination of the foregoing. DAROCUR and IRGACURE are both product names sold by Ciba Specialty Chemicals Co., Ltd. According to the present embodiment, the liquid crystal mixed material 306 is provided between the first substrate 302 and the second substrate 304 by a one drop fill (ODF) process, for example.

Figure 4B:
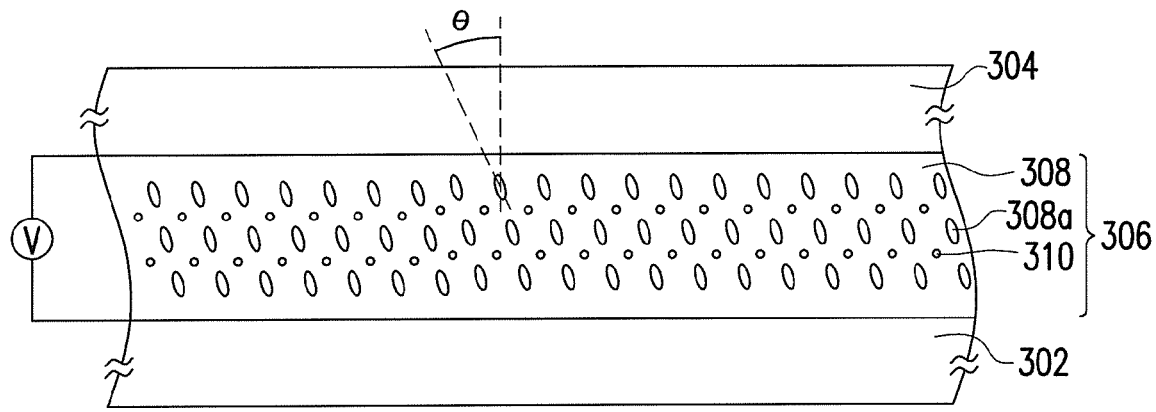

Referring to both FIGS. 3 and 4B, afterwards, a step S204 is performed to apply an electrical field on the liquid crystal composition 308 to align the liquid crystal molecules 308a at a pre-tilt angle θ, for example.

Figure 4C:
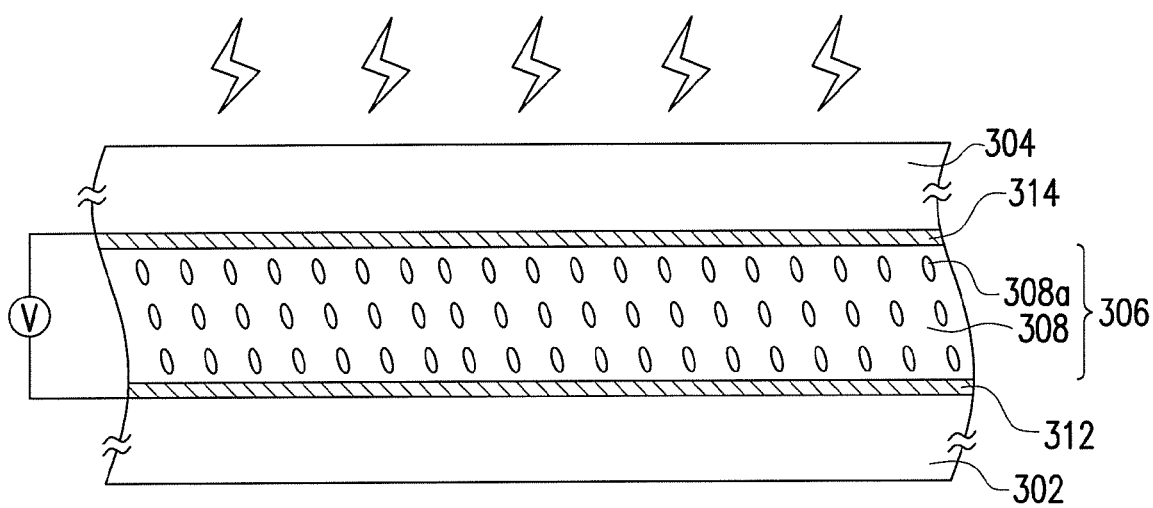

Referring to both FIGS. 3 and 4C, a step S206 is performed thereafter. At the same time when the electrical field is applied on the liquid crystal molecules 308a, an irradiation process is performed on the monomer material 310 and the polymerization initiator, for example, to polymerize the monomer material 310 such that a polymer stabilized alignment layer 312 between the liquid crystal mixed material 306 and the first substrate 302 or a polymer stabilized alignment layer 314 between the liquid crystal mixed material 306 and the second substrate 304 is selectively formed. An average surface roughness Rms of the polymer stabilized alignment layers 312 and 314 is controlled as 10 nm≦Rms≦40 nm. According to the present embodiment, the light irradiation process includes a first irradiation step and a second irradiation step. Specifically, an ultraviolet light with an irradiation intensity between about 0.2 mW/cm$^2$ and about 200 mW/cm$^2$ first irradiates the monomer material 310 and the polymerization initiator for a period between about 10 seconds and about 10 hours, preferably between about 120 seconds and about 1800 seconds. Next, an ultraviolet light with an irradiation intensity between about 0.2 mW/cm$^2$ and about 200 mW/cm$^2$ irradiates the monomer material 310 and the polymerization initiator for a period between about 10 seconds and about 10 hours, preferably between about 1 hour and about 6 hours. The present embodiment is exemplified by the ultraviolet light as a light source which polymerizes the monomer material, but the present invention is not limited thereto. In other embodiments, some visible lights with suitable wavelengths may also be used as the light source. In addition, a heating process may also be applied to polymerize the monomer material. In other words, an irradiation process or a heating process may be selected to polymerize the monomer material according to the characteristics of the monomer material. Further, the monomer material 310 may also be used to form the polymer stabilized alignment layers 312 and 314 between the liquid crystal mixed material 306 and the first substrate 302 and between the liquid crystal mixed material 306 and the second substrate 304 simultaneously.

Figure 4D:
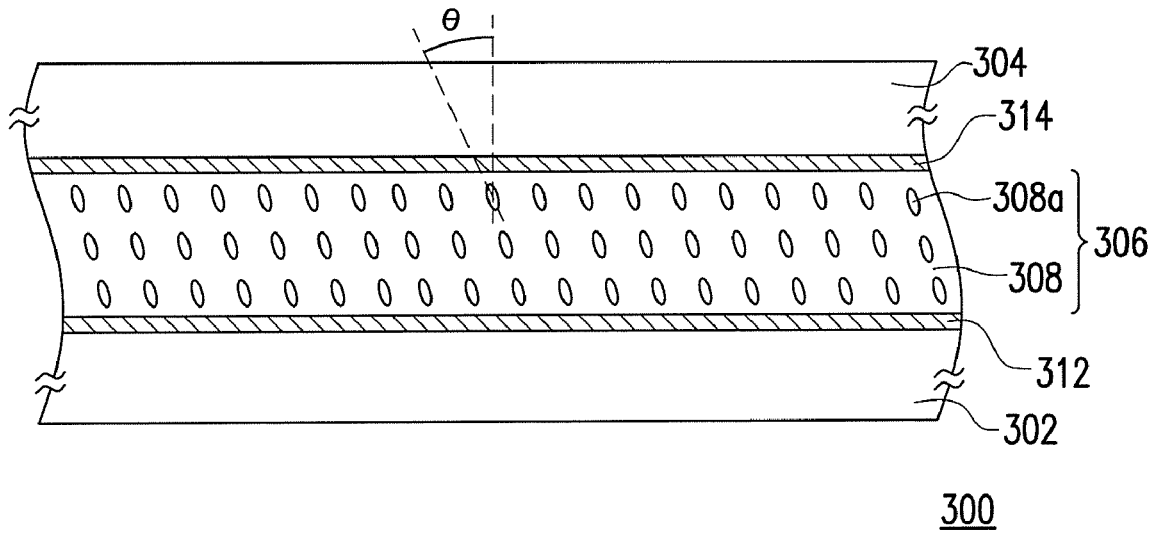

Referring to FIGS. 3 and 4D, after forming the polymer stabilized alignment layers 312 and 314, the electrical field is removed. Due to the aligning function of the polymer stabilized alignment layers 312 and 314, the liquid crystal molecules 308a remain aligned at the pre-tilt angle θ such that the LCD panel 300 has the characteristic of wide viewing angle.

According to the present embodiment, since the polymer stabilized alignment layers 312 and 314 are disposed on the first substrate 302 and the second substrate 304, and the average surface roughness Rms of the polymer stabilized alignment layers 312 and 314 are controlled as 10 nm≦Rms≦40 nm, the LCD panel 300 has satisfactory display characteristics such as fast response time, low light leakage, high contrast and low image sticking. Certainly, in order to further improve the contrast and the response time of the LCD panel and effectively avoid image sticking, the irradiation intensity and the irradiation time in the irradiation process may be controlled to render the average surface roughness Rms of the polymer stabilized alignment layer as 10 nm≦Rms≦30 nm.

Third Embodiment

Figure 5:
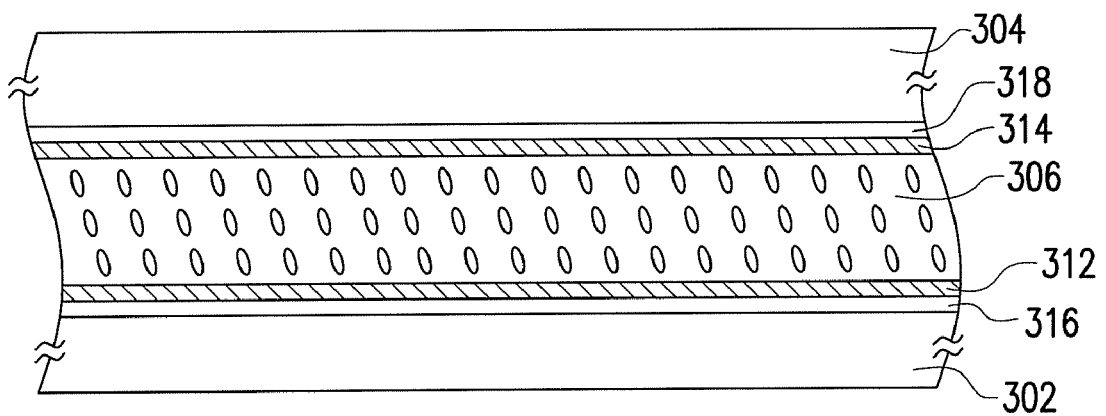
FIG. 5 is a schematic cross-sectional view of an LCD panel according to the third embodiment of the present invention.

FIG. 5 is a schematic cross-sectional view of an LCD panel according to the third embodiment of the present invention.

An LCD panel 300a has a structure similar to a structure of the LCD panel 300 in FIG. 4D, and thus the same components will be indicated with the same reference numerals. According to the present embodiment, in order to improve the aligning ability on the liquid crystal molecules, an alignment layer 316 and an alignment layer 318 are formed between the polymer stabilized alignment layer 312 and the first substrate 302 and between the polymer stabilized alignment layer 314 and the second substrate 304 respectively. In other words, in the flowchart of fabricating the LCD panel in the second embodiment, before sealing the liquid crystal mixed material 306, the alignment layers 316 and 318 are formed on the first substrate 302 and the second substrate 304 respectively. A material of the alignment layers 316 and 318 is, for example, polyimide or other suitable materials.

According to the present embodiment, the polymer stabilized alignment layers 312 and 314 are disposed on the first substrate 302 and the second substrate 304, and the average surface roughness Rms of the polymer stabilized alignment layers 312 and 314 are controlled as 10 nm≦Rms≦40 nm for satisfactory display characteristics such as fast response time, low light leakage, high contrast and low image sticking. Moreover, the alignment layers 316 and 318 are further disposed on the LCD panel 300a to further improve the aligning ability on the liquid crystal molecules.

The foregoing embodiment is exemplified by disposing the alignment layers simultaneously on the first substrate and the second substrate. However, the present invention is not limited to the example. In other embodiments, the alignment layers may also be solely disposed on the first substrate or the second substrate. In other words, when the substrate has an alignment layer, the polymer stabilized alignment layer is disposed between the alignment layer and the liquid crystal layer. When the substrate does not have an alignment layer, the polymer stabilized alignment layer is disposed between the substrate and the liquid crystal layer.

Accordingly, in the LCD panel of the present invention, the average surface roughness Rms of the polymer stabilized alignment layer disposed between the substrate and the liquid crystal layer is controlled as 10 nm≦Rms≦40 nm to enhance the aligning ability of the polymer stabilized alignment layer so as to reduce the response time of the LCD panel and prevent image sticking. Furthermore, compared with the conventional LCD panel with only alignment protrusions and alignment slits disposed therein, since the polymer stabilized alignment layer avoids light leakage caused by disclination in tilt directions of the liquid crystal molecules surrounding the alignment protrusions and the alignment slits, the LCD panel of the present invention has a better display contrast. Additionally, the present invention defines a specific range for the average surface roughness of the polymer stabilized alignment layer, which improves the LCD panel through speeding up response time, and thereby provides a policy to promote the display quality of LCD panels.

It will be apparent to those skilled in the art that various modifications and variations can be made to the structure of the present invention without departing from the spirit and scope of the invention. In view of the foregoing, it is intended that the present invention cover modifications and variations of this invention provided they fall within the scope of the following claims and their equivalents.

What is claimed is:

1. A liquid crystal display (LCD) panel, comprising:
a first substrate;
a second substrate disposed opposite to the first substrate;
a liquid crystal layer disposed between the first substrate and the second substrate; and
a polymer stabilized alignment layer disposed between the first substrate and the liquid crystal layer, wherein an average surface roughness Rms of the polymer stabilized alignment layer is in a range of 15.86 nm≦Rms≦40 nm, wherein a response time required for a transmittance ratio of the LCD panel increasing from 10% to 90% is smaller than 21 ms and greater than 5 ms.

2. The LCD panel as claimed in claim 1, wherein 11.23 nm≦Rms≦30 nm.

3. The LCD panel as claimed in claim 1, wherein a material of the polymer stabilized alignment layer is an optically polymerized material or a thermally polymerized material.

4. The LCD panel as claimed in claim 1, wherein the polymer stabilized alignment layer is formed by polymerizing an monomer material expressed in a chemical formula [1] as:

B-A-R     [1]

wherein A is selected from formulae [2], [3], [4] or any combination thereof:

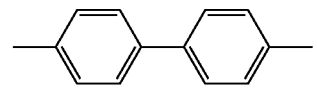
[2]

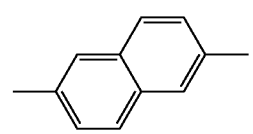
[3]

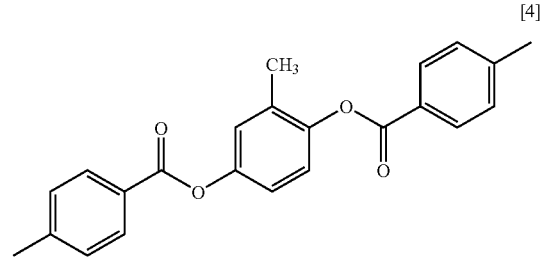
[4]

wherein at least one of B and R is selected from alkyl group, alkoxyl group, ester group, chemical formulae [5], [6], [7] or any combination thereof:

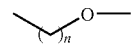
[5]

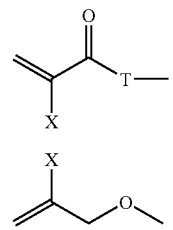
[6]

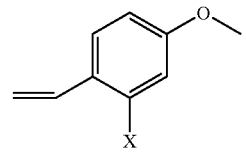
[7]

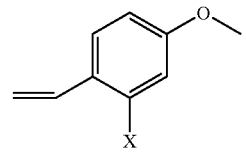
[8]

wherein T is selected from oxygen, nitrogen or any combination thereof, and X is selected from hydrogen, alkyl group, halogen, cyano group, or any combination thereof, n is a positive integer.

5. The LCD panel as claimed in claim 1, wherein the liquid crystal layer has a plurality of vertically-aligned liquid crystal molecules, and the liquid crystal molecules are aligned at a pre-tilt angle.

6. The LCD panel as claimed in claim 1, wherein the first substrate and the second substrate are a switch device array substrate and an opposite substrate interchangeably.

7. The LCD panel as claimed in claim 1, further comprising a first alignment layer disposed between the polymer stabilized alignment layer and the first substrate.

8. The LCD panel as claimed in claim 1, further comprising a second polymer stabilized alignment layer disposed between the second substrate and the liquid crystal layer.

9. The LCD panel as claimed in claim 8, further comprising a second alignment layer disposed between the second polymer stabilized alignment layer and the second substrate.

10. The LCD panel as claimed in claim 1, wherein the response time is smaller than 7 ms and greater than 5 ms.

* * * * *